Feb. 6, 1968  F. R. HICKERSON  3,367,360
FLUID PRESSURE REGULATOR
Filed July 16, 1965
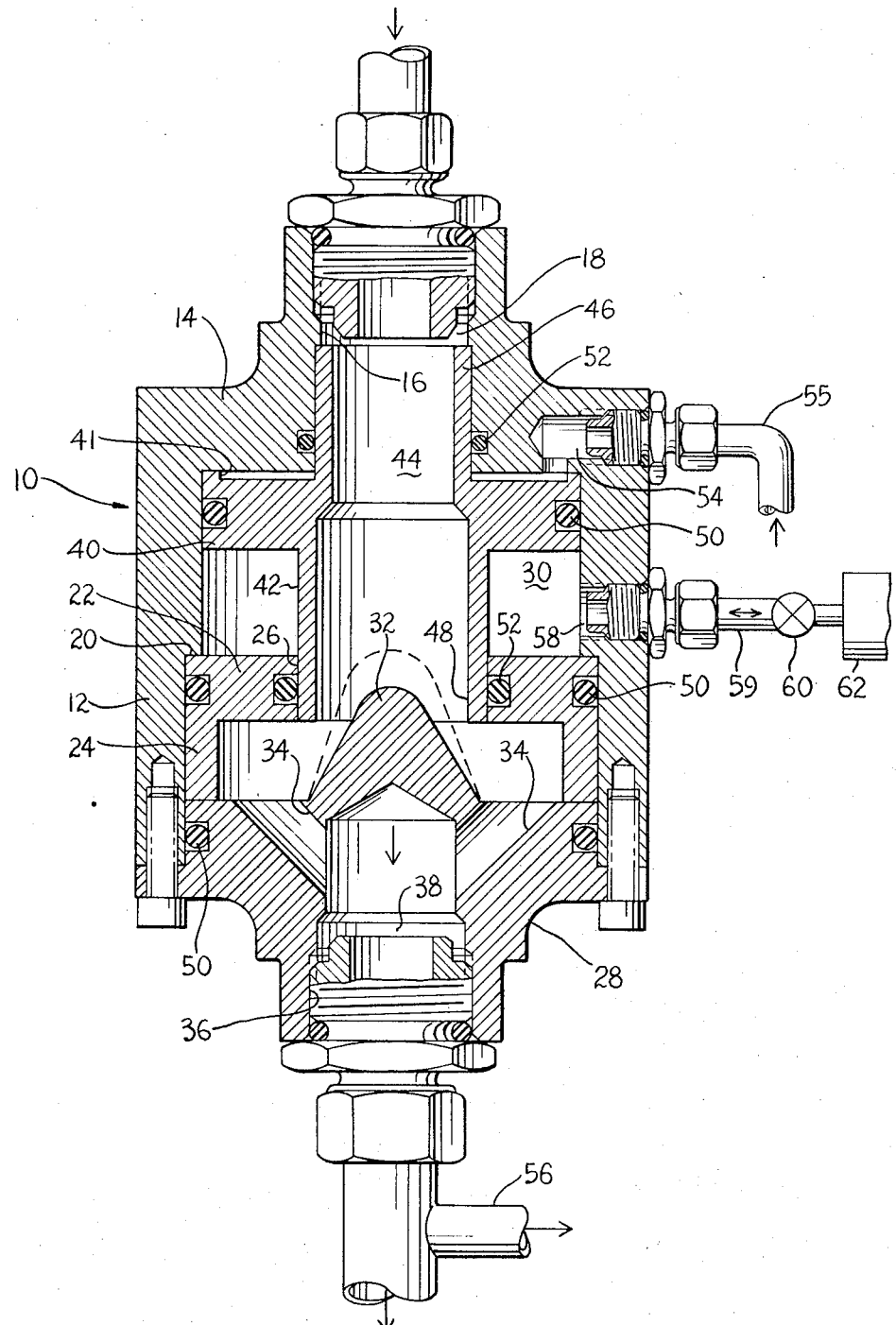
INVENTOR.
FREDERICK R. HICKERSON
BY
William R. Wright Jr.
AGENT 3,367,360
FLUID PRESSURE REGULATOR
Frederick R. Hickerson, Box 540, R.D. 4,
Newton, N.J. 07860
Filed July 16, 1965, Ser. No. 472,493
5 Claims. (Cl. 137—505.22)

ABSTRACT OF THE DISCLOSURE

A fluid pressure regulator having a piston subject on opposite sides to outlet pressure and a reference pressure to automatically move to a position of balance of pressure by varying the flow through the regulator outlet.

---

The present invention relates generally to fluid pressure systems and more particularly to an improved pressure regulator therefor.

Although fluid pressure regulators are well known in the art, none of them will satisfactorily handle corrosive rocket propellants such as nitric acid, hydrogen peroxide, etc., or other highly corrosive fluids insofar as is known. Moreover, known regulators are structurally complex, of unnecessary bulk and weight, inaccurate, excessive in reaction response time and in cost and maintenance, and usually regulate fluid flow instead of fluid pressure.

Accordingly, the main object of the present invention is to provide an improved fluid pressure regulator which will be free of the above and other objectionable characteristics of known regulators.

An important object of the present invention is to provide an improved fluid pressure regulator which is simple in construction and operation, light in weight, extremely reliable and accurate in operation with a quick reaction response time and a minimum of pressure variation, and suitable for use with corrosive and other fluids.

Another important object of the present invention is to provide an improved fluid pressure regulator which is readily assembled and disassembled and may be also employed as a shut-off valve.

Other objects and advantages of the present invention will become apparent during the course of the following description:

In the drawings there is shown one embodiment of the invention. In this showing:

The single figure is a central, longitudinal sectional view of a regulator constructed in accordance with the principles of the invention.

Referring to the drawings, numeral 10 designates the regulator as a whole which comprises a generally cylindrical body 12 closed at one end 14 except for a central, axially extending inlet bore 16, the outer end of which defines a fluid inlet port 18. The inner wall of the body 12 is provided intermediate its length with a peripheral shoulder 20 facing toward the open end.

An annular disk 22 having a peripheral skirt 24 and a central aperture 26 is clamped against the shoulder 20 by a bolted cover 28 and defines a chamber 30 with the inner face of the end wall 14. A conical valve 32 is formed on and projects inwardly from the inner face of the cover 28 which is provided with a plurality of angularly disposed flow passages 34 extending radially inward from the base of the conical valve 32 and into a central, axially extending bore 36 terminating in a fluid outlet port 38.

A control piston 40 is slidably mounted in the chamber 30 by means of its hollow piston rod 42 which defines a pressure fluid flow passage 44. The upstream end 46 of the piston rod 42 is slidably mounted in the inlet bore 16 while the downstream and larger end 48 is slidably mounted in the disk aperture 26 and functions as a movable valve seat cooperating with the conical valve 32 to throttle pressure fluid flow through the regulator as required.

Pressure fluid leakage between the body cover, disk, piston and regulator body and between the piston rod, disk and regulator body is prevented respectively by O-rings 50 and 52.

It is to be noted that the upstream face of the control piston 40 is recessed as at 41 so that pressure fluid may act against substantially its entire surface even when the piston is against the end wall 14. Pressure fluid is admitted to the upstream side of the piston in the chamber 30 through a "regulated" pressure inlet port 54 connected to a conduit 55 which may be connected to an outlet fluid pressure conduit 56 to sense the regulator pressure at any point downstream of the regulator outlet port 36.

The desired reference pressure is admitted to the chamber 30 against the downstream side of the control piston 40 by a "reference" pressure inlet port 58 from a conduit 59 having a valve 60 connected to a separate external source 62 of fluid pressure. The function of the valve 60 is to vent the chamber 30 on the downstream side of the piston so that it and its rod move to the conical valve 32 to shut off pressure fluid flow.

It is to be noted that the structural arrangement of the regulator 10 is such as to enable an extremely easy assembly and disassembly thereof as with the cover which is retained by bolts, etc. removed, the disk 22 and piston 40 with their O-rings may be readily inserted or removed.

The operation of the regulator 10 is believed to be apparent. The fluid whose pressure is to be regulated, which is at a pressure higher than the reference or set pressure, enters the body 12 through the inlet port 18, passes through the passages 44 and 34 and conduits 56, 55 to the "regulated" pressure inlet port 54 and acts against the upstream face of the control piston 40. The resultant movement of the piston and its hollow rod seat toward the conical valve is resisted by the "reference" pressure entering through the port 58 and the valve seat movement ceases when the two pressures are balanced.

It will be apparent that any pressure variation will be immediately and accurately offset by movement of the piston and its valve seat toward or away from the conical valve to vary the flow therethrough and establish a balance of the fluid pressure acting on the control piston. Thus, excellent regulation of outlet pressure is obtained under widely varying conditions of inlet fluid pressure and flow rate.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:
1. A fluid pressure regulator comprising, in combination, a body having fluid inlet and outlet bores; a valve head adjacent said outlet bore; a chamber in said body; a piston slidably mounted in said body and having a hollow piston rod connecting said bores and one end defining a valve seat and movable to and away from said valve head to vary the flow through said outlet bore, and means for simultaneously admitting fluid outlet pressure and a reference fluid pressure into said chamber on opposite sides of said piston to move said rod to vary the fluid pressure outlet flow to balance the pressure on said sides.

2. The combination recited in claim 1, and means for venting said reference pressure to effect movement of said rod to shut off pressure fluid flow.

3. A fluid pressure regulator comprising, in combination, a body having an open end, a closed end including an axial, fluid inlet bore, and an inner peripheral shoulder facing said open end; a disk having a peripheral skirt mounted in said housing; a body cover having an outlet port engaging said skirt and clamping said disk against said shoulder to define a chamber with said closed end; a conical valve head formed on the inner face of said cover; a piston in said chamber and having a hollow piston rod defining a fluid flow passage from said inlet bore to said outlet bore slidably mounted in said inlet bore to positions away from and seated against said conical valve head to vary the fluid pressure through said outlet bore in said cover; and means for admitting fluid outlet pressure and a reference fluid pressure to opposite sides of said piston in said chamber to vary the position of said piston rod with respect to said conical valve head and the fluid pressure through said outlet bore.

4. The combination recited in claim 3, wherein said means for admitting said reference fluid pressure includes means for venting said reference pressure acting against said piston to effect movement thereof by said fluid outlet pressure toward and seating of said hollow piston rod against said conical valve head to shut off fluid pressure flow through said cover.

5. A fluid pressure regulator comprising, in combination, a generally cylindrical body including a peripheral shoulder intermediate its length and having an open end and a closed end; a bore formed centrally of and extending axially through said closed end; an apertured disk including a skirt mounted in said body; a cover connected to said body and engaging said skirt to clamp said disk against said shoulder; said cover having a central conical valve extending toward said closed end; an axial bore formed centrally in said cover and extending from its outer face to the base of said valve, and fluid passages formed through the inner face of said cover and extending into said cover bore; a piston having one recessed face slidably mounted in said body between said closed end and said disk; said piston being mounted on a hollow rod defining a fluid pressure flow passage and having a close sliding fit in said closed end bore and in the aperture of said disk and being movable from an open closed-body-end position to a closed, conical-valve-engaging position; and means for admitting regulated and reference fluid pressure against opposite sides of said piston to effect movement of said piston and said valve engaging rod to balance said pressures by varying the pressure fluid flow past said valve and through said cover bore.

References Cited
UNITED STATES PATENTS

| | | | |
|---|---|---|---|
| 1,406,011 | 2/1922 | Hinchman | 137—505.22 |
| 2,680,454 | 6/1954 | MacGlashan | 137—505.28 |
| 2,888,949 | 6/1959 | Evans | 137—505.25 |
| 3,196,901 | 7/1965 | Phillips | 137—505.25 |

FOREIGN PATENTS 970,655  10/1958  Germany.

WILLIAM F. O'DEA, *Primary Examiner.*

HAROLD WEAKLEY, *Examiner.*